(12) United States Patent
Helstern et al.

(10) Patent No.: US 8,109,538 B2
(45) Date of Patent: Feb. 7, 2012

(54) MICROBARB TUBING CONNECTOR

(75) Inventors: Gary Helstern, Newton, CT (US);
LaCroix Robert, Southberry, CT (US);
Jose Almeida, Milford, CT (US)

(73) Assignee: Diba Industries, Inc., Danbury, CT (US)

( * ) Notice: Subject to any disclaimer, the term of this patent is extended or adjusted under 35 U.S.C. 154(b) by 0 days.

(21) Appl. No.: 12/884,756

(22) Filed: Sep. 17, 2010

(65) Prior Publication Data

US 2011/0018260 A1 Jan. 27, 2011

Related U.S. Application Data

(63) Continuation of application No. PCT/US2010/042884, filed on Jul. 22, 2010.

(60) Provisional application No. 61/227,653, filed on Jul. 22, 2009.

(51) Int. Cl.
*F16L 33/00* (2006.01)

(52) U.S. Cl. ........................ 285/239; 285/247

(58) Field of Classification Search ........... 285/239–259
See application file for complete search history.

(56) References Cited

U.S. PATENT DOCUMENTS

| | | | |
|---|---|---|---|
| 3,711,130 A | 1/1973 | Betzler | |
| 3,833,246 A * | 9/1974 | Wake | 285/247 |
| 4,165,893 A | 8/1979 | Fields | |
| 4,291,903 A | 9/1981 | Fields | |
| 4,439,188 A | 3/1984 | Dennehey et al. | |
| 4,603,890 A | 8/1986 | Huppee | |
| 4,772,152 A | 9/1988 | Gill | |
| 4,915,421 A | 4/1990 | Dennany Jr. | |
| 5,176,415 A | 1/1993 | Choksi | |
| 5,348,048 A | 9/1994 | Schirado et al. | |
| 5,507,536 A | 4/1996 | Oliveto, II et al. | |
| D387,147 S | 12/1997 | Vandermast et al. | |
| 5,709,413 A | 1/1998 | Salyers | |
| 5,715,863 A | 2/1998 | Paczonay | |
| 5,770,139 A | 6/1998 | Kinghorn et al. | |
| 5,823,580 A | 10/1998 | Ungerecht | |

(Continued)

FOREIGN PATENT DOCUMENTS

KR 10-0736878 7/2007

OTHER PUBLICATIONS

International Search Report and Written Opinion pertaining to PCT/US2010/042884, dated Feb. 9, 2011.

*Primary Examiner* — Aaron Dunwoody
(74) *Attorney, Agent, or Firm* — Dinsmore & Shohl LLP

(57) ABSTRACT

A connection assembly for coupling a soft tubing to a tubular element of a torque fitting comprises a barbed connector and a shell adapted to contain the barbed connector. The barbed connector comprises a neck having a barb disposed on an exterior surface of the neck and a substantially cylindrical sealing portion disposed between the barb and a tubing end of the neck. The barbed connector further comprises a mating surface adapted to form a fluid-tight seal when compressed against a mating end of the tubular element. A tubing connection comprises the connection assembly having a length of soft tubing attached to the neck of the barbed connector and a tubular element compressed against the mating surface of the barbed connector.

17 Claims, 5 Drawing Sheets

U.S. PATENT DOCUMENTS

| | | |
|---|---|---|
| 5,893,590 A | 4/1999 | Klinger et al. |
| 6,086,574 A | 7/2000 | Carroll et al. |
| 6,173,995 B1 | 1/2001 | Mau |
| 6,447,020 B1 | 9/2002 | Kacines et al. |
| 6,502,864 B1 | 1/2003 | Savard |
| 6,846,124 B2 | 1/2005 | Warburton-Pitt |
| 7,404,581 B2 * | 7/2008 | Baving et al. ............ 285/242 |
| 7,472,931 B2 | 1/2009 | Kerin et al. |
| 2004/0189007 A1 | 9/2004 | Olich |
| 2004/0212191 A1 | 10/2004 | Segal et al. |
| 2005/0189765 A1 | 9/2005 | Maunder et al. |
| 2006/0208110 A1 | 9/2006 | Guo |
| 2008/0143107 A1 | 6/2008 | Bowling et al. |
| 2009/0179422 A1 | 7/2009 | Werth |
| 2009/0182272 A1 | 7/2009 | Li et al. |

* cited by examiner

MICROBARB TUBING CONNECTOR

CROSS REFERENCE TO RELATED APPLICATIONS

This application is filed under 35 U.S.C. §111(a) as a continuation of International Patent Application No. PCT/US2010/042884, filed Jul. 22, 2010, which international application designates the United States and claims the benefit of U.S. Provisional Application Ser. No. 61/227,653, filed Jul. 22, 2009.

SUMMARY

Embodiments described herein relate to a connection assembly for fluidly coupling soft, flexible, or semi-rigid tubing to semi-rigid or rigid tubing. The connection assembly comprises a barbed connector and a shell having an inner cavity defined therein, the inner cavity being adapted to support the barbed connector within the inner cavity when a soft tubing engages a barb of the barbed connector and a tubular element engages a mating face of the barbed connector.

Further embodiments described herein relate to a tubing connection, wherein a length of soft tubing is received on a neck of the barbed connector and a tubular element is compressed by a torque fitting against a mating surface of the barbed connector. The barbed connector is disposed within the shell.

BRIEF DESCRIPTION OF THE DRAWINGS

Though the specification concludes with claims particularly pointing out and distinctly claiming the invention, it is believed that the present invention will be better understood from the following description taken in conjunction with the accompanying drawings in which:

Features and advantages of the invention now will be described with occasional reference to specific embodiments. However, the invention may be embodied in different forms and should not be construed as limited to the embodiments set forth herein. Rather, these embodiments are provided so that this disclosure will be thorough and complete and will fully convey the scope of the invention to those skilled in the art.

DETAILED DESCRIPTION

A connection assembly according to embodiments described herein may be used for coupling a soft tubing to a tubular element of a torque fitting. As used herein, the term "soft tubing" refers to any conventional or yet to be developed tubing material described by those skilled in the art as "semi-rigid" or "non-rigid." Examples of soft tubing include, but are not limited to, Tygon® tubing (silicone tubing), Norprene® tubing (a thermoplastic elastomer), polyvinyl chloride (PVC) tubing, Santoprene® tubing (a thermoplastic vulcanizate), PharMed® tubing (an inert peristaltic pump tubing), Marprene® tubing (a thermoelastic polymer), Viton® tubing (a thermoset fluoroelastomer), Chemsure® tubing (a composite of polytetrafluoroethylene and fluoroelastomer), and other known or to-be-developed types of pinch tubing and peristaltic pump tubing.

As used herein, the term "torque fitting" refers to any type of fitting having a tubular element and mechanical threads adapted to compress the tubular element against a body disposed in a shell having a threaded interior wall. Non-limiting examples of torque fittings include threaded fittings described in U.S. Pat. No. 7,299,725 and U.S. Pre-Grant Pub. No. 2008/0194338, and fittings incorporating compressible ferrules, such as the fittings described in U.S. Pre-Grant Pub. No. 2009/0218813, all of which documents being assigned to Diba Industries, Inc., the entire disclosures of which documents are incorporated herein by reference. The tubular element itself may comprise any known or to-be-developed tubing material compatible with the torque fitting. A specific, non-limiting example of a material for the tubular element may include conventional or to-be-developed semi-rigid fluoropolymer tubings.

In general, the connection assembly comprises a barbed connector disposed within a shell. The shell may be adapted to engage a mating surface of the barbed connector when the connection assembly is assembled. The barbed connector has a neck adapted to receive the soft tubing and a mating surface adapted to form a fluid-tight seal against a mating end of a tubular element of a torque fitting. These and other features of the connection assembly will be made apparent with reference to the figures.

Figure 1:
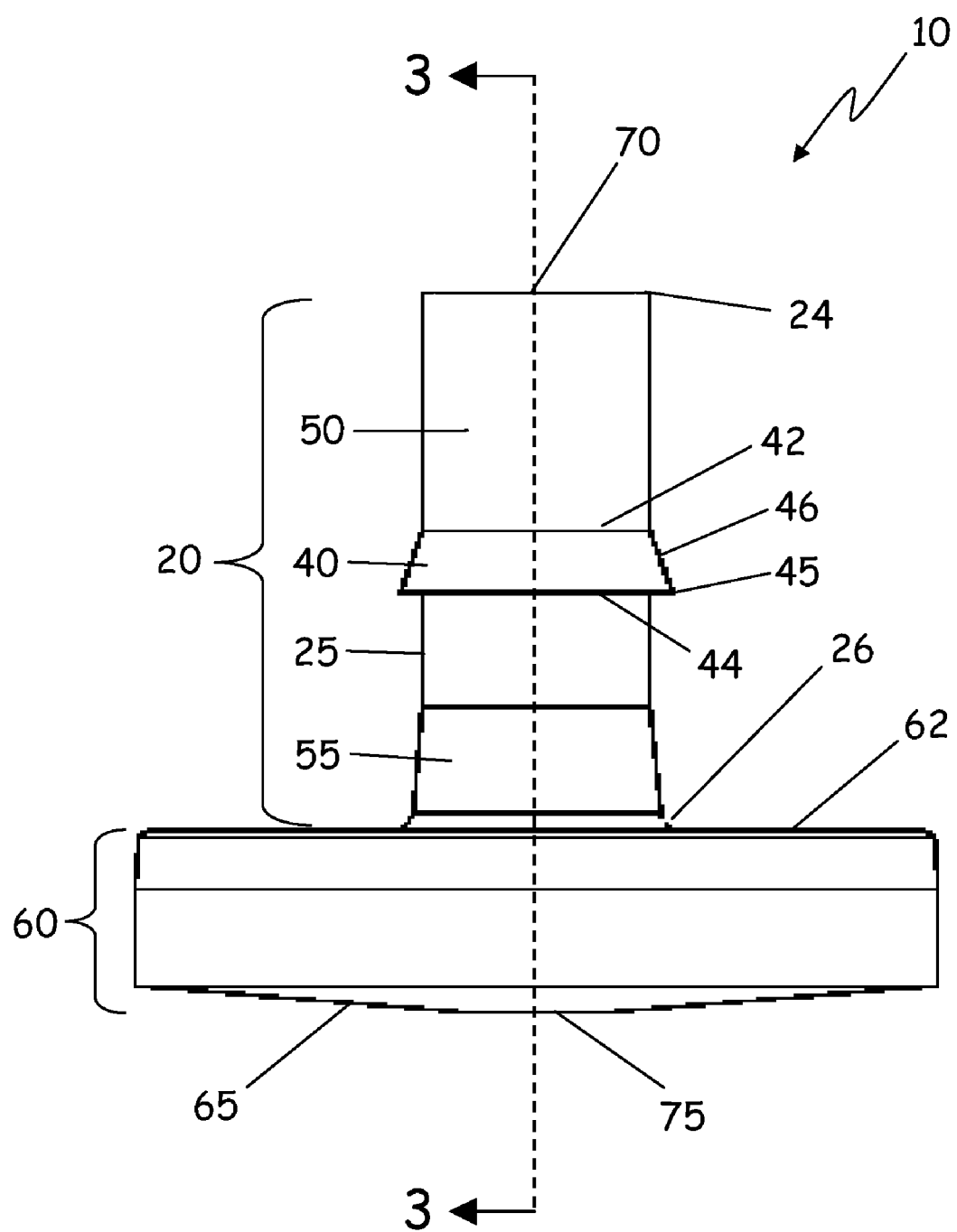
FIG. 1 is a side view of a barbed connector according to embodiments described herein.
Figure 2:
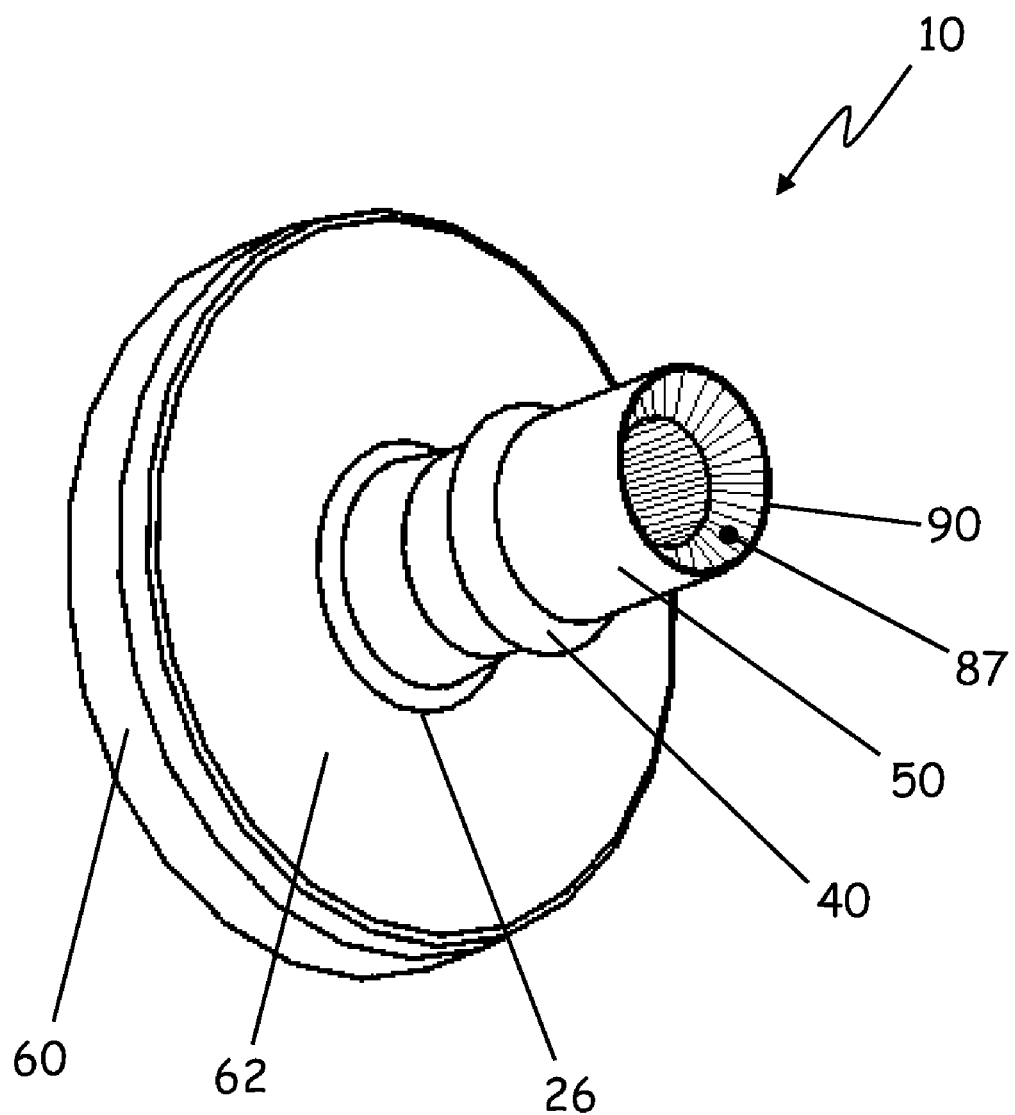
FIG. 2 is a perspective view of the barbed connector shown in FIG. 1.
Figure 3:
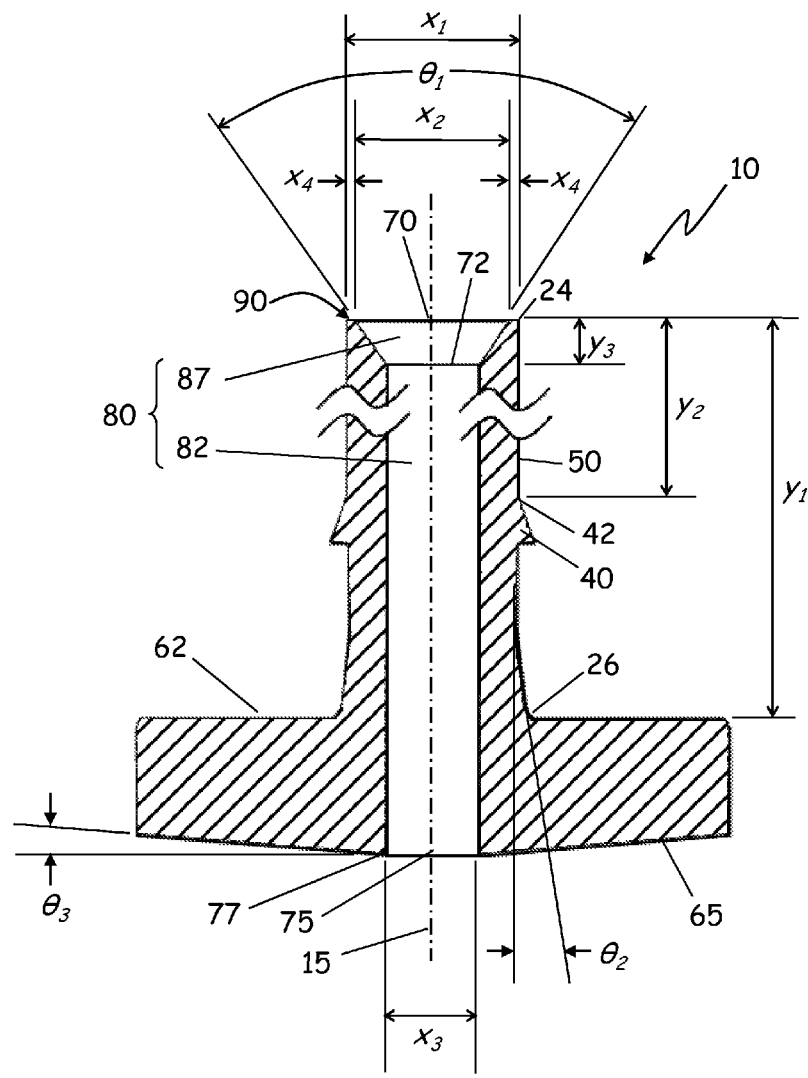
FIG. 3 is a cross-sectional view of the barbed connector in FIG. 1.

Referring to FIGS. 1-3, the barbed connector 10 comprises a neck 20 and a base 60. The neck 20 comprises a tubing end 24 having a neck opening 70 defined therein. The neck 20 further comprises a base end 26 opposite the tubing end 24. The neck 20 has a neck length $y_1$, measured from the tubing end 24 to the base end 26. In preferred embodiments, the barbed connector 10 may be a single, integral piece machined or otherwise constructed from rigid or semi-rigid materials such as, for example, polymers, rubbers, plastics, or metals, or suitable mixtures thereof. As a specific example, PolyEtherEtherKetone (PEEK) is particularly well suited for use as the barbed conductor 10, owing to its rigidity and chemical inertness. Though FIGS. 1-3 depict the barbed connector 10 as having a substantially circular cross-section in all planes perpendicular to the longitudinal axis 15, it will be apparent that modifications could be made to the rotational geometry of the barbed connector 10. For example, it is contemplated that the neck 20, the base 60, or both, may comprise a non-circular rounded or polygonal cross-section in one or more planes perpendicular to the longitudinal axis 15.

A barb 40 is disposed on an exterior surface 25 of the neck 20. The barb 40 shown in FIGS. 1-3 for purposes of illustration, not by way of limitation, defines a radially protruding frustoconical shape having a barb narrow end 42 facing the neck opening 70, a barb wide end 44 facing the base opening 75, a barb slope 45 between the barb narrow end 42 and the barb wide end 44, and a barb point 46. In general, the barb 40 is adapted to engage an interior wall of soft tubing received on the neck 20. Insofar as this purpose may be accomplished by any type of surface feature on the neck 20, the particular geometry of the barb 40, including the width of the barb wide end 44 and the angle of the barb slope 45 relative to the longitudinal axis 15, is not critical. Though the barbed connector 10 in FIGS. 1-3 is shown as having only one barb, it is contemplated that one or more additional barbs (not shown) may be added to the neck between the barb 40 and the base end 26.

The neck 20 further comprises a substantially cylindrical sealing portion 50 disposed between the barb 40 and the tubing end 24. In particular, as shown in FIGS. 1-3, the substantially cylindrical sealing portion 50 extends from the barb narrow end 42 of the barb 40 to the tubing end 24. The substantially cylindrical sealing portion 50 has a sealing-portion outside diameter $x_1$ and a sealing-portion length $y_2$. As shown in FIG. 3, the substantially cylindrical sealing portion 50 may be cylindrical, such that the sealing portion outside diameter $x_1$ is the same along the entire sealing-portion length $y_2$ from the barb narrow end 42 of the barb 40 to the tubing end 24. The sealing-portion outside diameter $x_1$ is at least equal to the inside diameter of the soft tubing desired to be connected to the neck 20 of the barbed connector 10. Because soft tubing is by nature stretchable, in preferred embodiments it may be desirable for creating an optimal seal that the sealing-portion outside diameter $x_1$ be slightly greater than the inside diameter of the soft tubing desired to be connected, for example, from 1% to 10% greater, depending on the material of the soft tubing. Thus, in further preferred embodiments the sealing-portion outside diameter $x_1$ may be from 100% to 110% of the inside diameter of the soft tubing. Choosing the sealing-portion outside diameter $x_1$ to be substantially equal to or slightly greater than the inside diameter of the soft tubing may ensure a proper leak-tight seal of the soft tubing over the neck 20 of the barbed connector 10.

Figure 4:
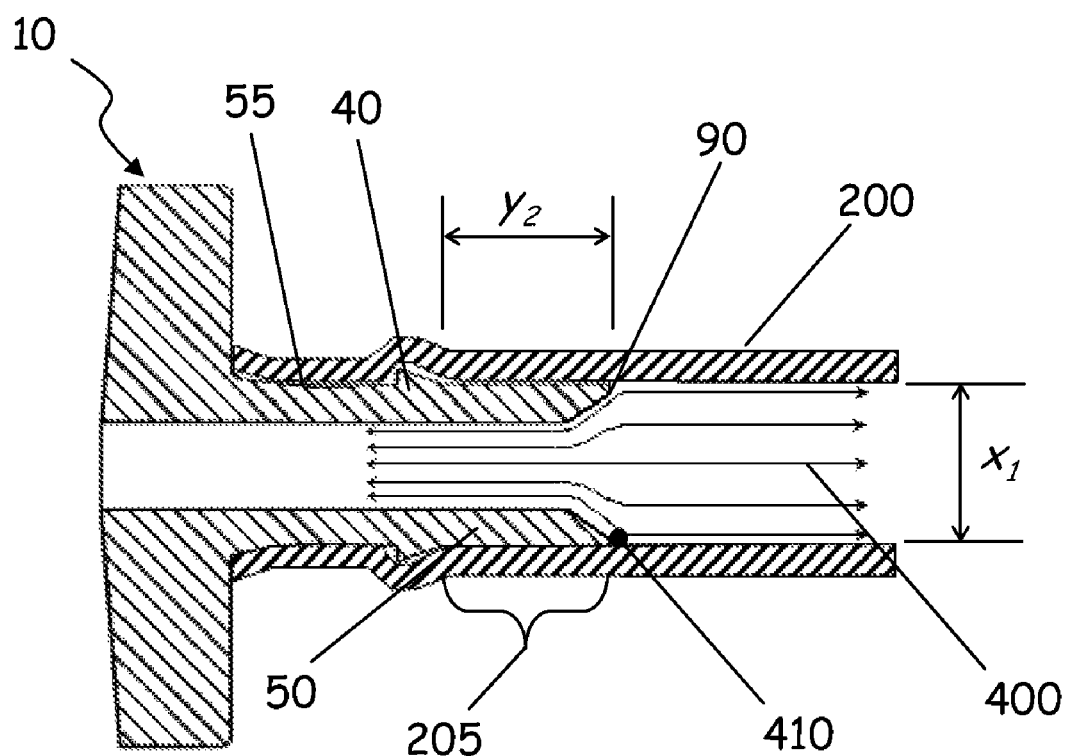
FIG. 4 illustrates various features of the barbed connector when the barbed connector is inserted into a soft tubing.

The sealing-portion length $y_2$ of the barbed connector 10 may vary. In example embodiments, the sealing-portion length $y_2$ may be at least 20%, alternatively from about 25% to about 50% of the neck length $y_1$. In further example embodiments, the sealing-portion length $y_2$ may be equal to or greater than 80% of the sealing-portion outside diameter $x_1$, alternatively equal to or greater than 90% of the sealing-portion outside diameter $x_1$. In preferred embodiments, the sealing-portion length $y_2$ is equal to or greater than the sealing-portion outside diameter $x_1$. In examples of the preferred embodiments, the sealing-portion length $y_2$ may be greater than 110% of the sealing-portion outside diameter $x_1$, alternatively from 110% to 150% of the sealing-portion outside diameter $x_1$. It is believed that a substantially cylindrical sealing portion 50 having a sealing-portion length $y_2$ equal to or greater than the sealing-portion outside diameter $x_1$ minimizes disruption of fluid flow through the soft tubing into or out of the barbed connector 10, particularly when compared with a connector having a barbed feature disposed at or near the opening of the connector. This effect is illustrated in FIG. 4, in which the barbed connector 10 is shown maximally inserted into a soft tubing 200. The barb 40 is configured such that the substantially cylindrical sealing portion 50 has a sealing-portion length $y_2$ equal to the sealing-portion outside diameter $x_1$. The substantially cylindrical sealing portion 50 causes a flat section 205 of the soft tubing 200 to lie flat against the barbed connector 10, particularly against the substantially cylindrical sealing portion 50 itself, more particularly against the substantially cylindrical sealing portion 50 where the substantially cylindrical sealing portion 50 meets the tubing end 24 (see FIG. 1; identifiable in FIG. 4 as where the substantially cylindrical sealing portion 50 meets the minimal edge 90). This, in turn, prevents, so as to prevent disruption of the fluid flow 400, such as in the form of a dead zone, an eddy current, or the like, at the influx zone 410.

Referring to FIGS. 1 and 3, in preferred embodiments, the exterior surface 25 of the neck 20 may define an widened end portion 55 between the barb 40 and the base end 26. The widened end portion 55 may define a widened end portion angle $\theta_2$ of from about 1° to about 10°, preferably from about 3° to about 7°, more preferably about 5°. As shown in FIG. 4, when the soft tubing 200 is received over the widened end portion 55, the opening of the soft tubing 200 is stretched slightly outwardly away from the center of the barbed connector 10. It is believed that this slightly outwardly directed stretching produces a tension in the soft tubing 200 over the widened end portion 55 that in turn produces a relaxing of the soft tubing 200 over the barb 40 and the substantially cylindrical sealing portion 50. The relaxing of the soft tubing 200 in these locations may result in a more effective seal and also enhance the benefits of having a flat section 205 of the soft tubing 200 with regard to minimizing flow disruption, as described above. In addition, the widened end portion 55 adds mechanical strength and stability to the neck 20 of the barbed connector 10, such as to prevent bending or breaking when the soft tubing 200 is attached to the neck 20.

Referring to FIGS. 1-3, the base 60 of the barbed connector 10 comprises a seating surface 62 and a mating surface 65. The seating surface 62 is connected to the base end 26 of the neck 20. The mating surface 65 is opposite the seating surface 62 and has a base opening 75 defined therein. In preferred embodiments, the mating surface 65 has a mating-surface slope $\theta_3$ toward the seating surface 62 along the entire width of the mating surface 65 extending outwardly with respect to the longitudinal axis 15 from a base-opening edge 77. The mating-surface slope $\theta_3$ may be configured so as to adapt the mating surface 65 to form a fluid-tight seal against a mating end of a chosen type of tubular element for coupling to soft tubing received on the neck 20 of the barbed connector 10 in the connection assembly, as will be described in further detail below. In example embodiments, the mating-surface slope $\theta_3$ may be from about 1° to about 15°, alternatively from about 1° to about 10°, alternatively from about 3° to about 15°, alternatively from about 3° to about 10°, alternatively from about 3° to about 7°, alternatively about 5°. The base-opening edge 77, shown in FIG. 3 as a corner at the junction of the mating surface 65 and the base opening 75, may have a sharp angle or a rounded contour.

Referring with particularity to FIG. 3, a fluid conduit 80 is defined in the barbed connector 10. The fluid conduit 80 is configured to provide fluid communication between the neck opening 70 and the base opening 75. The fluid conduit 80 comprises a substantially cylindrical conduit portion 82 contiguous with the base opening 75. The substantially cylindrical conduit portion 82 has a cylindrical-portion diameter $x_3$ less than the neck-opening diameter $x_2$. In preferred embodiments, the cylindrical-portion diameter $x_3$ may be chosen to be about equal to the inside diameter of the tubular element intended to be connected to the base opening 75. The fluid conduit 80 may be defined concentrically with a longitudinal axis 15 of the barbed connector 10, such that the fluid conduit 80 may provide a substantially straight flowpath for fluids through the barbed connector 10. However, other flowpath geometries are contemplated that may include bends. The exact flowpath geometry is not critical.

In preferred embodiments, the fluid conduit 80 may further comprise a flared conduit portion 87 between the neck opening 70 and the substantially cylindrical conduit portion 82, such that the junction of the flared conduit portion 87 and the substantially cylindrical conduit portion 82 defines an orifice 72 having the cylindrical portion diameter $x_3$. The flare angle $\theta_1$ of the flared conduit portion 87 and the flared-portion length $y_3$ of the flared conduit portion 87 are not critical. However, in preferred embodiments the flare angle $\theta_1$ may range from about 30° to about 90°, alternatively from about 40° to about 80°, alternatively from about 50° to about 70°, alternatively from about 55° to about 65°. The flared portion length $y_3$ preferably is minimized with respect to the neck length $y_1$ to avoid substantially weakening the walls of the neck 20 of the barbed connector 10. In especially preferred embodiments, the flared conduit portion 87 may be configured such that a minimal edge 90 is formed around the neck opening 70 of the barbed connector 10. The minimal edge 90 may have a minimal-edge width $x_4$ of less than or equal to 15%, alternatively from about 3% to about 15%, alternatively from about 5% to about 12%, alternatively from about 7% to about 12%, of the sealing-portion width $x_1$.

It is believed that the presence of a flared conduit portion 87 in the fluid conduit 80 allows the minimal-edge width $x_4$ of the minimal edge 90 to be substantially smaller than would be practical if the entire length of the fluid conduit 80 has substantially the same diameter. Namely, to achieve a very small minimal-edge width $x_4$ without a flared conduit portion 87 would require that the neck 20 of the barbed connector 10 have very thin walls potentially susceptible to collapse. Thus, minimization of minimal-edge width $x_4$ may be confounded by a decrease in wall strength of the neck 20 when no flared conduit portion 87 is present. Conversely, the walls of the neck 20 may be thicker, stronger, and more durable when a flared conduit portion 87 is present in the fluid conduit 80, such that the minimal-edge width $x_4$ may be substantially narrower without compromising wall strength. As illustrated in FIG. 4, by minimizing the minimal-edge width $x_4$ of the minimal edge 90, disruptions of the fluid flow 400 in the influx zone 410 may be further minimized, because the fluid does not encounter a sharp bend or corner as it enters or leaves the barbed connector 10.

Figure 5:
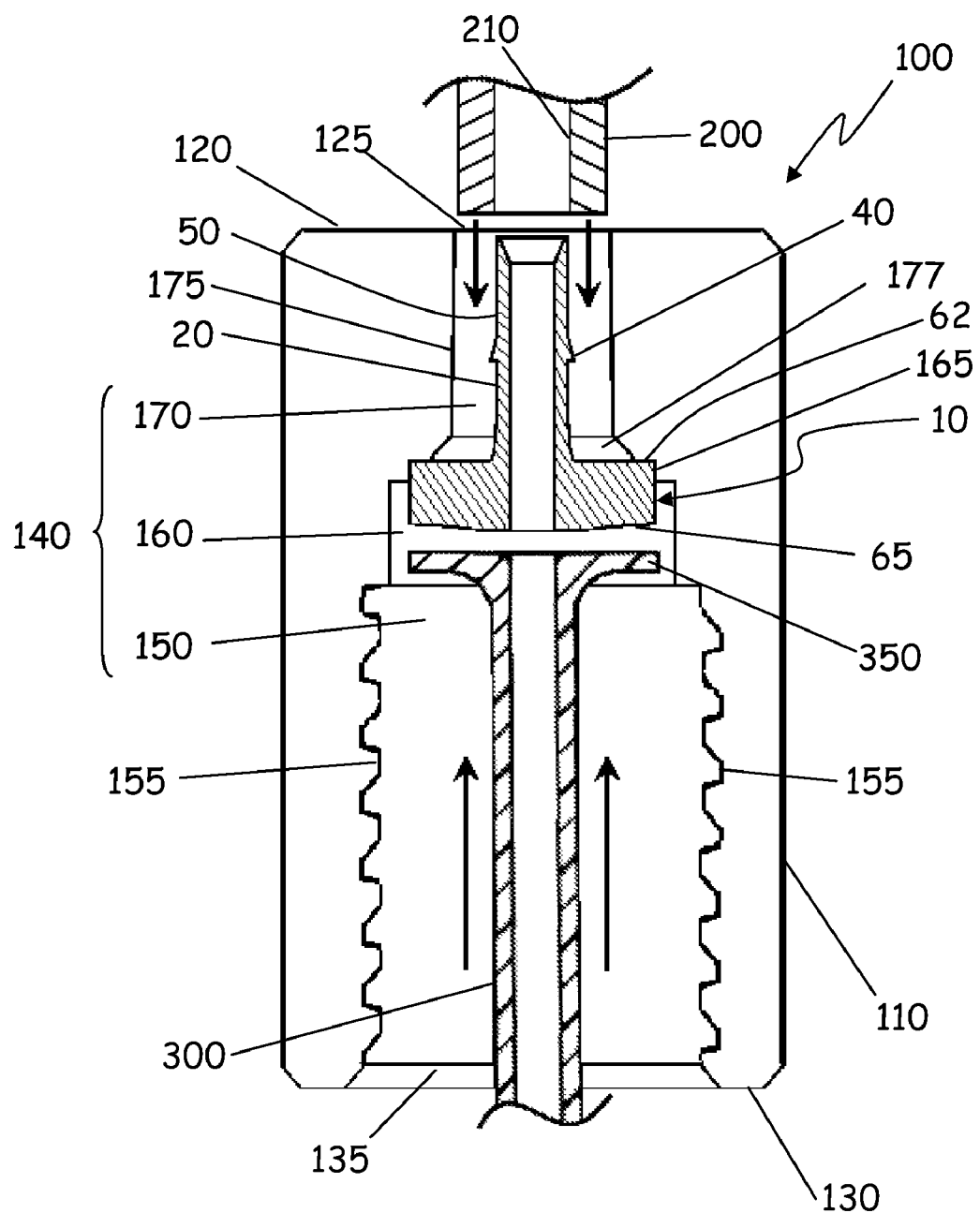
FIG. 5 is a cross-sectional view of a connection assembly including a barbed connector, according to embodiments described herein.

In an example embodiment shown in FIG. 5 by way of illustration, not of limitation, the barbed connector 10 may be disposed within a shell 110 as part of a connection assembly 100. The shell 110 of the connection assembly comprises a barbed-connector end 120 having a barbed-connector opening 125 defined therein. The shell 110 further comprises a torque-connector end 130 opposite the barbed-connector end 120, and the torque-connector end 130 has a torque-fitting opening 135 defined therein. The shell 110 that may be formed from any rigid or semi-rigid material, preferably inert to corrosive chemicals such as acids and also preferably biologically inert. In preferred examples, the shell 110 may comprise or be formed from a hard plastic such as PEEK.

Fluid coupling of the soft tubing 200 and the tubular element 300 may be accomplished through the barbed connector 10 within an inner cavity 140 defined in the shell 110 between the barbed-connector opening 125 and the torque-fitting opening 135. The structure of the inner cavity 140 is defined by a threaded portion 150, a compression portion 170, and a coupling portion 160.

The threaded portion 150 of the inner cavity 140 is contiguous with the torque-fitting opening 135 and is laterally bound by a threaded wall 155 having mechanical threads adapted to receive corresponding threads of the torque fitting (not shown). The geometric configuration of the threaded wall 155 is not critical, particularly with regard to shape of the mechanical threads, pitch of the mechanical threads, and any other common distinguishing aspect of any mechanical thread. The shape of the threads composing the threaded wall 155 in FIG. 5 are intended by way of illustration, not by way of limitation.

The compression portion 170 of the inner cavity 140 is contiguous with the barbed-connector opening 125 and is laterally bound by a compression wall 175. In preferred embodiments, the compression portion may comprise a tubing-end expansion zone 177 contiguous with the coupling portion 160. The tubing-end expansion zone 177 may accommodate any stretching of the soft tubing 200 either as a result of firmly pressing the soft tubing 200 against the seating surface 62 of the barbed connector 10 or as a result of expansion of the soft tubing 200 over the widened end portion 55 (see FIG. 1) of the barbed connector 10.

The compression wall 175 may be adapted to compress the soft tubing 200 against the barb 40 of the barbed connector 10. For example, the compression wall 175 may be configured to define a width of the compression portion 170 approximately equal to the outside diameter of the soft tubing 200 desired to be connected to the neck of the barbed connector 10. Because soft tubing is by nature compressible, it may even be desirable that the width of the compression portion be slightly less than the outside diameter of the soft tubing desired to be connected, for example, from 90% to about 100% the outside diameter of the soft tubing 200, depending on the material of the soft tubing 200.

The coupling portion 160 of the inner cavity 140 is disposed between the threaded portion 150 and the compression portion 170. The coupling portion 160 is bound by a seating wall 165 adapted to engage the seating surface 62 of the barbed connector 10 such that the barbed connector 10 may be inserted into the inner cavity 140 through the torque-fitting opening 135 but be prevented from slipping entirely through the inner cavity 140.

When the barbed connector 10 is maximally inserted into the inner cavity 140, as shown in FIG. 5, the barb 40 on the neck 20 of the barbed connector 10 is disposed within the compression portion 170 of the inner cavity 140. Though in the example connection assembly 100 shown in FIG. 5 the neck 20 of the barbed connector 10 is disposed entirely within the compression portion 170, it will be understood that a portion of the substantially cylindrical sealing portion may extend beyond the barbed-connector opening 125 as long as the interior surface 210 of the soft tubing 200 can be pressed against the barb 40 by the compression wall 175. The distance between the tubing end 24 of the barbed connector 10 (see FIG. 1) and the barbed-connector opening 125 in the connection assembly 100 is not critical, provided the sealing-portion length $y_2$ is equal to or greater than the sealing-portion outside diameter $x_1$ (see FIG. 3). Thus, the length of the compression portion 170 may be equal to or greater than the neck length $y_1$.

Referring still to FIG. 5, an non-limiting, illustrative example of a tubular element 300 is depicted as insertable into the inner cavity 140 of the shell 110 through the torque-fitting opening 135. The tubular element 300 comprises a mating end 350. When the tubular element 300 is disposed within a torque fitting (not shown) and threads on the torque fitting are tightened against the threaded wall 155, the mating end 350 of the tubular element 300 is compressed against the mating surface 65 of the barbed connector 10. As described above, the mating surface 65 may be adapted to form a fluid-tight seal against the mating end 350 of the tubular element 300 when the mating end 350 is compressed against the mating surface 65, such as by configuring the mating surface 65 to have a mating-surface slope $\theta_3$ (see FIG. 3). The mating end 350 of the tubular element 300 may itself have some degree of pliability so as to conform under compression of the torque fitting to the contour of the mating surface 65 of the barbed connector 10. As noted above, in alternative embodiments, the tubular element 300 may comprise compressible ferrule assemblies, such as those described in U.S. Pre-Grant Pub. No. 2009/0218813, incorporated herein by reference.

In an illustrative example of an assembling procedure for the connection assembly 100 with further reference to FIG. 5, first a length of the soft tubing 200 may be inserted through the barbed-connector opening 125 of the shell 110 entirely through the inner cavity 140 until the length of the soft tubing 200 emerges through the torque-fitting opening 135. Then, the neck 20 of the barbed connector 10 may be inserted into the soft tubing 200 so that the barb 40 engages an interior surface 210 of the soft tubing 200 and the soft tubing abuts the seating surface 62 of the barbed connector 10.

Then, the soft tubing 200, with the barbed connector 10 attached thereto, may be pulled back out through the barbed-connector opening 125 until the seating surface 62 of the barbed connector 10 engages the seating wall 165 in the coupling portion 160 of the inner cavity 140 of the shell 110. When the barbed connector 10 engages the seating wall 165, the neck 20 of the barbed connector 10 will extend into the compression portion 170 of the inner cavity 140, such that the compression wall 175 will exert pressure against the soft tubing 200 and further engage the barb 40 into the interior surface 210 of the soft tubing 200.

Thereupon, the torque fitting (not shown), having the tubular element 300 disposed therein with the mating end 350 of the tubular element 300 oriented toward the barbed connector 10, may be inserted into the torque-fitting opening 135 and to engage threads of the torque fitting the threaded wall 155 of the inner cavity 140 of the shell 110. Finally, the torque fitting may be rotated to tighten the torque fitting and cause the mating end 350 of the tubular element 300 to be compressed against the mating surface 65 of the barbed connector 10. Thereby, a fluid-tight coupling is established between the soft tubing 200 and the tubular element 300. The fluid-tight coupling may be characterized as having minimal dead volume within any fluid flow path and negligible or no susceptibility to leakage.

Though the absolute scaling and dimensions of the connection assembly 100 are not critical to the advantages inherent therewith, in preferred embodiments, the connection assembly 100 shown in FIG. 5 may be incorporated into microfluidic systems requiring precise control of fluid flows and involving small volumes of fluid. As non-limiting examples of absolute dimensions applicable to microfluidic applications, the connection assembly 100 may be configured to accommodate soft tubings having small inside diameters of from about 0.010 inches (0.254 mm) to about 0.060 inches (1.52 mm) and outside diameters of from about 0.062 inches (1.58 mm) to about 0.156 inches (3.96 mm). For such small sizes of soft tubing, the barbed connector 10 may have a neck length $y_1$ of from about 0.100 inches (2.54 mm) to about 0.200 inches (5.08 mm), a base-opening diameter $x_3$ of from about 0.010 inches (0.254 mm) to about 0.020 inches (0.508 mm), a sealing-portion length $y_2$ of from about 0.030 inches (0.762 mm) to about 0.060 inches (1.52 mm), and a minimal-edge width $x_4$ of from about 0.003 inches (0.08 mm) to about 0.010 inches (0.25 mm). It will be understood, however, that these absolute dimensions are provided as examples and that it is contemplated for the connection assembly 100 to be employed in even smaller-scale applications or in much larger-scale applications.

For the purposes of describing and defining the present invention it is noted that the terms "substantially" and "about" are utilized herein to represent the inherent degree of uncertainty that may be attributed to any quantitative comparison, value, measurement, or other representation. Also, the terms "substantially" and "about" are utilized herein to represent the degree by which a quantitative representation may vary from a stated reference without resulting in a change in the basic function of the subject matter at issue. For example, the term "substantially cylindrical structure" encompasses not only a cylindrical structure, but also structures having a major and a minor axis varying by a small amount such as 5% to 10%, as well as structures that would be cylindrical but for some minor imperfection, intended or unintended, provided the structures maintain the basic function of the structure indicated as a "substantially cylindrical structure."

The terms "horizontal" and "vertical," as used in this disclosure are relative terms that do not necessarily indicate perpendicularity. The terms also may be used for convenience to refer to orientations used in the figures, which orientations are used as a matter of convention only and are not intended as characteristic of the devices shown. The present invention and the embodiments thereof to be described herein may be used in any desired orientation, and horizontal and vertical walls need be only intersecting walls, not necessarily perpendicular walls. Similarly, the terms "top" and "bottom" are used for convenience and do not imply any preferred orientation.

What is claimed is:

1. A connection assembly comprising:
   a barbed connector comprising:
      a neck adapted to receive a soft tubing, the neck having a neck length, the neck comprising:
         a tubing end having a neck opening defined therein, the neck opening having a neck-opening diameter;
         a base end opposite the tubing end;
         a barb disposed on an exterior surface of the neck for engaging an interior wall of the soft tubing, the barb having a barb narrow end facing the neck opening; and
         a sealing portion extending from the barb narrow end to the tubing end, the sealing portion being cylindrical and having a sealing-portion outside diameter and a sealing-portion length, the sealing-portion length being equal to or greater than 90% of the sealing-portion outside diameter, the sealing-portion outside diameter being the same along the entire sealing-portion length from the barb narrow end to the tubing end; and
      a base comprising:
         a seating surface connected to the base end of the neck; and
         a mating surface opposite the seating surface, the mating surface having a base opening defined therein; and
      a fluid conduit defined in the barbed connector so as to provide fluid communication between the neck opening and the base opening; and
   a shell having an inner cavity defined therein, the inner cavity comprising:
      a threaded portion laterally bound by a threaded wall having mechanical threads;
      a seating wall for engaging the seating surface of the barbed connector; and
      a compression portion laterally bound by a compression wall, such that the neck of the barbed connector is disposed in the compression portion.

2. The connection assembly of claim 1, wherein the sealing-portion length is equal to or greater than the sealing-portion outside diameter.

3. The connection assembly of claim 1, wherein the neck further comprises a widened end portion between the barb and the base end, the widened end portion having a widened end portion angle of from about 1° to about 10°.

4. The connection assembly of claim 1, wherein the neck further comprises a minimal edge disposed around the neck opening, the minimal edge having a minimal-edge width of less than or equal to 15% of the sealing-portion outside diameter.

5. The connection assembly of claim 1, wherein the minimal-edge width is from about 5% to about 12% of the sealing-portion outside diameter.

6. The connection assembly of claim 1, wherein the fluid conduit comprises:
- a substantially cylindrical conduit portion contiguous with the base opening and having a cylindrical-portion diameter less than the neck-opening diameter; and
- a flared conduit portion between the neck opening and the substantially cylindrical conduit portion, the junction of the flared conduit portion and the substantially cylindrical conduit portion defining an orifice.

7. The connection assembly of claim 6, wherein the flared portion has a flare angle of from about 30° to about 90°.

8. The connection assembly of claim 6, wherein the flared portion has a flare angle of from about 50° to about 70°.

9. The connection assembly of claim 1, wherein the shell further comprises:
- a barbed-connector end having a barbed-connector opening defined therein; and
- a torque-connector end opposite the barbed-connector end, the torque-connector end having a torque-connector opening defined therein, such that:
- the inner cavity is disposed in the shell between the barbed-connector opening and the torque-connector opening;
- the threaded portion is contiguous with the torque-connector opening; and
- the compression portion is contiguous with the barbed-connector opening, the inner cavity further comprising a coupling portion disposed between the threaded portion and the compression portion, the coupling portion bound by the seating wall.

10. The connection assembly of claim 9, wherein the compression portion comprises a tubing-end expansion zone contiguous with the coupling portion.

11. A connection assembly for coupling a soft tubing to a tubular element of a torque fitting, the connection assembly comprising:
- a barbed connector comprising:
  - a neck for receiving the soft tubing thereon, the neck having a neck length and comprising:
    - a tubing end having a neck opening defined therein, the neck opening having a neck-opening diameter;
    - a base end opposite the tubing end;
    - a barb disposed on an exterior surface of the neck for engaging an interior wall of the soft tubing, the barb having a barb narrow end facing the neck opening;
    - a sealing portion extending from the barb narrow end to the tubing end, the sealing portion being cylindrical and having a sealing-portion outside diameter and a sealing-portion length, the sealing-portion outside diameter being the same along the entire sealing-portion length from the barb narrow end to the tubing end, the sealing-portion length being equal to or greater than 90% of the sealing-portion outside diameter; and
    - a minimal edge disposed around the neck opening, the minimal edge having a minimal-edge width of less than or equal to 15% of the sealing-portion width; and
  - a base comprising:
    - a seating surface connected to the base end of the neck; and
    - a mating surface opposite the seating surface, the mating surface having a base opening defined therein; and
  - a fluid conduit defined in the barbed connector so as to provide fluid communication between the neck opening and the base opening, the fluid conduit comprising:
    - a substantially cylindrical conduit portion contiguous with the base opening and having a cylindrical-portion diameter less than the neck-opening diameter; and
    - a flared conduit portion between the neck opening and the substantially cylindrical conduit portion, the junction of the flared conduit portion and the substantially cylindrical conduit portion defining an orifice, the flared conduit portion having a flare angle of from about 30° to about 90°; and
- a shell having an inner cavity defined therein, the inner cavity supporting the barbed connector within the inner cavity when the soft tubing engages the barb of the barbed connector and the mating face engages a mating end of the tubular element.

12. A tubing connection comprising:
- a length of a soft tubing having a connection end, a tubing inside diameter, and a tubing outside diameter;
- a tubular element disposed in a torque fitting, the torque fitting having exteriorly disposed mechanical threads; and
- a connection assembly comprising a shell and a barbed connector, the barbed connector disposed within an inner cavity defined in the shell, the inner cavity having a seating wall for supporting the barbed connector, wherein:
- the barbed connector comprises a neck and a base, the base comprising a seating surface, the seating surface connected to a base end of the neck;
- the barbed connector has a fluid conduit defined therein, the fluid conduit extending from a neck opening to a base opening, the neck opening being defined in a tubing end of the neck and having a neck-opening diameter, the base opening being defined in a mating surface of the base, the mating surface opposite the seating surface;
- the neck of the barbed connector comprises:
  - a barb disposed on an exterior surface of the neck, the barb having a barb narrow end facing the neck opening; and
  - a sealing portion extending from the barb narrow end to the tubing end, the sealing portion being cylindrical and having a sealing-portion outside diameter and a sealing-portion length, the sealing-portion outside diameter being the same along the entire sealing-portion length from the barb narrow end to the tubing end, the sealing-portion length being equal to or greater than 90% of the sealing-portion outside diameter;
- the inner cavity of the shell comprises:
  - a threaded portion laterally bound by a threaded wall; and
  - a compression portion laterally bound by a compression wall, the compression wall defining a compression-portion width of from 90% to 100% of the tubing outside diameter;
- the neck of the barbed connector receives the connection end of the soft tubing thereon, such that the compression wall of the shell compresses the soft tubing against the barb of the barbed connector;
- a flat section of the soft tubing lies flat against the sealing portion where the sealing portion meets the tubing end, so as to prevent disruption of fluid flow at an influx zone adjacent to the neck opening;

the exteriorly disposed mechanical threads of the torque fitting engage the mechanical threads of the threaded wall of the shell; and a mating end of the tubular element contacts the mating surface of the barbed connector and is compressed against the mating surface when the torque fitting is tightened, so as to form a fluid-tight seal between the mating end and the mating surface.

13. The tubing connection of claim 12, wherein the sealing-portion outside diameter is from 1% to 10% greater than the tubing inside diameter.

14. The tubing connection of claim 13, wherein the mating surface has a mating-surface slope of from about 1° to about 15°.

15. The tubing connection of claim 13, wherein mating surface has a mating-surface slope of from about 3° to about 10°.

16. The tubing connection of claim 13, wherein the fluid conduit comprises:
   a substantially cylindrical conduit portion contiguous with the base opening and having a cylindrical-portion diameter less than the neck-opening diameter; and
   a flared conduit portion between the neck opening and the substantially cylindrical conduit portion, the flared conduit portion having a flare angle of from about 30° to about 90°.

17. The tubing connection of claim 16, wherein a minimal edge is disposed around the neck opening, the minimal edge having a minimal-edge width of less than or equal to 15% of the sealing-portion width.

* * * * *

UNITED STATES PATENT AND TRADEMARK OFFICE
CERTIFICATE OF CORRECTION

| | | |
|---|---|---|
| PATENT NO. | : 8,109,538 B2 | |
| APPLICATION NO. | : 12/884756 | |
| DATED | : February 7, 2012 | |
| INVENTOR(S) | : Gary Helstern, LaCroix Robert and Jose Almeida | |

It is certified that error appears in the above-identified patent and that said Letters Patent is hereby corrected as shown below:

Title Page, Item (75) Inventors: Gary Helstern, "Newton" should read --Newtown--

Signed and Sealed this
Fourteenth Day of August, 2012

David J. Kappos
*Director of the United States Patent and Trademark Office*